(12) United States Patent
Massholder

(10) Patent No.: US 6,467,467 B1
(45) Date of Patent: Oct. 22, 2002

(54) METHOD AND DEVICE FOR PLASMA-CHEMICAL REDUCTION OF GASEOUS AND/OR SOLID POLLUTANTS IN EXHAUST GASES OF INTERNAL COMBUSTION ENGINES

(75) Inventor: Karl F. Massholder, Schoenau bei Heidelberg (DE)

(73) Assignee: Mitsubishi Aluminum Co., LTD, Tokyo (JP)

( * ) Notice: Subject to any disclaimer, the term of this patent is extended or adjusted under 35 U.S.C. 154(b) by 0 days.

(21) Appl. No.: 09/807,466

(22) PCT Filed: Oct. 13, 1999

(86) PCT No.: PCT/EP99/07693

§ 371 (c)(1),
(2), (4) Date: May 15, 2001

(87) PCT Pub. No.: WO00/22292

PCT Pub. Date: Apr. 20, 2000

(30) Foreign Application Priority Data

Oct. 13, 1998 (DE) .......................... 198 47 096

(51) Int. Cl.$^7$ .......................... F02M 27/04; F02B 51/04
(52) U.S. Cl. ...................................................... 123/536
(58) Field of Search ................. 123/536, 537, 123/538, 143 B

(56) References Cited

U.S. PATENT DOCUMENTS

| | | | | |
|---|---|---|---|---|
| 3,749,545 A | * | 7/1973 | Velkoff | 123/538 |
| 3,921,605 A | | 11/1975 | Wyczalek | |
| 4,091,779 A | * | 5/1978 | Saufferer et al. | 123/536 |
| 4,284,054 A | * | 8/1981 | Kumagai et al. | 123/536 |
| 4,287,862 A | * | 9/1981 | Noguchi et al. | 123/536 |
| 4,380,978 A | * | 4/1983 | Maynard, Jr. et al. | 123/536 |
| 4,561,406 A | | 12/1985 | Ward | 123/536 |
| 5,237,969 A | * | 8/1993 | Sakin | 123/536 |
| 6,092,512 A | * | 7/2000 | Ma | 123/568.15 |

FOREIGN PATENT DOCUMENTS

DE    42 31 581    3/1994

OTHER PUBLICATIONS

Patent Abstracts of Japan, 60–219412 (Feb. 11, 1985), Ryoji Nakajima, "Combustion Chamber of Internal–Combustion Engine".

* cited by examiner

Primary Examiner—Marguerite McMahon
(74) Attorney, Agent, or Firm—Foley & Lardner

(57) ABSTRACT

A method for the plasma-chemical reduction of gaseous and/or solid pollutants in exhaust gases of internal combustion engines by using dielectric-barrier discharges is proposed, the dielectric-barrier discharges being carried out in the combustion space (4) of the internal combustion engine.

17 Claims, 3 Drawing Sheets

METHOD AND DEVICE FOR PLASMA-CHEMICAL REDUCTION OF GASEOUS AND/OR SOLID POLLUTANTS IN EXHAUST GASES OF INTERNAL COMBUSTION ENGINES

The invention relates to the plasma-chemical reduction of gaseous and/or solid pollutants in exhaust gases of internal combustion engines by using dielectric-barrier discharges, and to a device intended for this purpose.

In the scope of tightening the standards for the limitations on pollutant emissions during the operation of internal combustion engines, in particular in motor vehicles, new technologies have also been proposed in addition to the improvement of conventional, in particular catalytic, methods.

Dielectric-barrier discharge (hereafter abbreviated to DBD) in a plasma, the physical principles of which have already been known for a long time, is highly promising in this regard. The plasma-is generated by applying an alternating voltage or pulsed voltage between two electrodes; if a dielectric is arranged between the electrodes, however, it is not possible to form a steady-state discharge but only discharges which become quenched again after a short time, so-called silent transient discharges.

From Rosocha, Louis A. et al.: "Innovative Technologies for Removing Toxic Compounds from Groundwater and Air"; New Mexico Conference on the Environment, Sep. 13—15, 1992, Albuquerque, N. Mex., it is known that hydrocarbons can be cleaned from mixtures with air or argon/oxygen in the mass ratio 80:20. Reduction of the concentration of trichloroethene, trichloroethane, $CCl_3CF_3$, $CCl_4$ and aliphatic hydrocarbons is described as an example. Using only a few watts of electrical power at a flow rate of 10l/m (corresponding to a few tens of J/l), with a saturated water content in an argon/oxygen mixture (argon/oxygen mass ratio =80:20) it was possible, for example, to clean trichloroethene from 650 ppm to values below 1 ppm, and with powers of 1 kj/l to below 1 ppb. Using a power input of a few tens kWh/kg, trichloroethane at initial concentrations in the percent range could be reduced to ppm ranges, and aliphatic hydrocarbons with initial concentrations of from 1000 ppm to 3000 ppm and $CCl_3CF_3$ with an initial concentration of 200 ppm could be reduced by 80% to 90%.

Dhali, S. K. and Sardja, I.: "Dielectric-barrier Discharge for Processing of $SO_2$, $NO_x$"; J. Appl. Phys. p69 (9), May 1, 1992 describes studies of the treatment of conventional inorganic pollutants, in particular nitrogen oxides and sulfur dioxide. According to this article, nitrogen monoxide could be fully oxidized and, depending on the conditions used, sulfur dioxide could be cleaned by 40%–70%.

The term gaseous pollutants is here intended to mean undesired substances, in particular those defined in exhaust gas standards, primarily hydrocarbons, nitrogen oxides and sulfur dioxide. An example of a solid pollutant, especially in emissions from diesel engines, is soot.

DE-A-42 31 581 describes a device and a method for the plasma-chemical decomposition and/or elimination of pollutants using a DBD electrode arrangement to which the pollutants are fed, wherein all the operating parameters of the plasma-chemical reactions, for example temperature, nature and mass flow rate of impurities, electrical power and dielectric constant of the dielectric, are intended to be controlled in such a way that the desired decomposition of the pollutants is maximized. Said document relates, however, only to exhaust-gas post-treatment by means of DBD.

In relation to this, it is an object of the invention to ensure further reduction of pollutants by means of DBD, with the intention that the pollutants are reduced not only by exhaust-gas post-treatment but, primarily, by avoiding the formation of pollutants. It is also an object to provide a method and a device which ensure balancing of the combustion process in internal combustion engines and reduction of the fuel consumption.

The invention is based on a method for the plasma-chemical reduction of gaseous and/or solid pollutants in exhaust gases of internal combustion engines by using dielectric-barrier discharges.

The solution in accordance with the method according to the invention is then characterized in that the dielectric-barrier discharges are carried out in the combustion space of the internal combustion engine.

It has been found that DBDs can economically be performed directly in the combustion space of the internal combustion engine.

When a strong electric field is applied to electrodes that have a gas between them, free electrons are accelerated and, when a threshold field strength is exceeded, they can excite and ionize heavy particles (atoms, molecules). The primary electrons originate from the natural background electron density in the gas, which is due to natural radioactivity and cosmic radiation.

The released electrons are in turn accelerated, and avalanche-type growth of the electron density occurs, together with gas breakdown (Raether breakdown). By overlapping successive avalanches, a high-conductivity discharge channel (streamer) is created, which leads to the formation of a spark or arc. When the discharge is formed in this way, if metallic electrodes are present the gas is strongly heated as the flow of current continues, and a plasma in local thermal equilibrium is created.

If at least one dielectric barrier (whence dielectric-barrier discharge, DBD) is present in the gas space, then the internal field is reduced as the discharge continues, by local build-up of charges on the surfaces of the dielectrics, to such an extent that the discharge becomes quenched again, i.e. it does not change into a thermally relaxing plasma with hot sparks and arcs. By applying a pulsed voltage, the energy input into the polluting gas can be dictated externally by means of the voltage amplitude, frequency, pressure etc.

Dielectric-barrier discharges, or silent discharges, are hence transient glow discharges that can be operated even at standard pressure. The electrodes are in this case separated from the filler gas by suitable dielectrics, and a large number of different reaction-chamber geometries (plate, tube, coaxial and multi-chamber geometries) can readily be implemented, which permits greater flexibility in terms of the installation position.

For use in order to reduce pollutants in exhaust gases, it is important for the DBD to be self-terminating, i.e. the energy input into the exhaust-gas plasma takes place during the period of the active current pulse (<1 $\mu$s).

In this case, although high electron temperatures in the range of from 10,000 K to 100,000 K are reached, depending e.g. on the pressure, reactor geometry, voltage and frequency the heavy-particle temperature nevertheless reaches substantially lower values owing to the low ion mobility and the short pulse period.

Thermal non-equilibrium hence exists, which is very important for the treatment of pollutants in exhaust gases, since (with suitable cooling) treatment only slightly above room temperature is possible.

The pollutants are accordingly disassociated not thermally, but primarily by collisions with electrons (average electron energy from 1 to 10 eV). The effectiveness of the method relies on the high electron densities ($10^{18} cm^{-3}$) that can be produced in this case. Furthermore, the high-energy photons (in the vacuum-UV and UV range) that are emitted during the discharge additionally contribute to the disassociation or excitation by means of secondary processes.

The application of a high voltage causes pollutant particles in the gas flow to be ionized, with the released electrons in turn contributing to the ionization or excitation. This leads to avalanche-type growth of the electron density and gas breakdown, in conjunction with the emission of photons due to the transition of excited particles to their ground state. Therefore, both electrons (primarily) and photons (secondarily) contribute to the exhaust-gas treatment by means of DBD. In this context, it should be noted that higher energies can in principle be transferred during collisions with electrons than in the case of photons, and that new species, such as super-excited neutral or charged particles can be created.

The precise mechanism of the breakdown of organic compounds by DBD is still substantially unknown. It can, however, safely be assumed that the discharge causes the production of reactive radicals (e.g. OH radicals) which, because of their high oxidizing power, have affect organic compounds. To that extent, the DBD method replicates the natural photochemical breakdown processes in the atmosphere. Even in the optimized ideal case, however, 100% breakdown and total elimination of pollutants cannot be expected since the propagators of the breakdown reactions are non-specifically reactive radicals. Although even radical reactions take place according to defined mechanisms, it is difficult to predict the resulting products. Furthermore, the question of by-products is further complicated by the fact that not only OH radicals must be taken into account, but nitrogen-oxygen radicals can also be created if the conditions are suitable. The latter may—hypothetically—react with corresponding organic molecules and convert them, for example, into nitro-aromatic structures.

Furthermore, DBD leads to the creation of vacuum-UV photons directly at the reaction site, i.e. photons with a wavelength less than 170 nm which can cause further radical formation and even disassociation of other pollutants.

The DBDs are advantageously produced by a pulsed voltage which is applied between two metallic components of the combustion space that are separated from each other by a dielectric, in particular by at least one ceramic component. According to the method according to the invention, already existing metallic components of the combustion space may hence be utilized in a cost-effective and economical way. Suitable examples include, in particular, spark plugs or parts thereof, the piston bottom or walls of the combustion chamber or parts thereof. The dielectric must electrically isolate the two electrodes; any dielectric material is basically suitable for this, and there are no restrictions regarding the shape of the dielectric and the way in which it is arranged. It is particularly preferable to use a ceramic component for this purpose.

Preferably, the frequency of the applied pulsed voltage is from 50 Hz to 50 kHz, preferably 1–30 kHz.

It is particularly preferable to apply a voltage having square-wave pulses.

The voltage is advantageously 1–500 kV, preferably 10–300 kV.

According to a particularly advantageous variant of the method, the DBDs are triggered at the mix-ignition time and/or at a later time in the combustion cycle by a control, and the control is performed by means of voltage and/or frequency as a function of the load and pollutants. Using such control, in a manner comparable with ignition control, the DBD can be triggered at the optimum mix-ignition time and can therefore lead to more uniform combustion with lower amounts of pollutants. The primary occurrence of pollutants in the combustion process is thereby reduced. In this case, even with very lean mixes, the combustion occurs substantially simultaneously and uniformly throughout the combustion space, owing to the impulse-like breakdown of the electron avalanche and the lightning-like creation of vacuum-UV photons. The propagation of the combustion process is therefore no longer limited by the relatively slow flame front. More uniform combustion, and hence combustion with lower amounts of pollutants, is likewise achieved in the case of these engines.

Furthermore, using a second discharge in a combustion cycle, for example during the ejection process, pollutants that have been created can be reduced while they are still in the combustion space.

It is particularly advantageous to control the DBDs in such a way that they are predominantly triggered in the cold-start phase and, for example using temperature control, are stepped down after the conventional catalyst has started to work. It is known that the cold-start phase, generally the first 200 seconds of operation, causes over 90% of the cumulative hydrocarbon emissions in a standardized test cycle. For reduction of pollutants, in particular $NO_x$, in continuous operation, load-dependent control is advantageous. This minimizes the consumption of electrical energy and hence improves economy.

According to another advantageous variant of the method, the breakdown power is additionally increased by deliberate production of UV radiation at a specific wavelength. Accordingly, a filler gas which, when the dielectric-barrier discharges are ignited, emits UV rays at particular wavelengths which interact in a specifically intended way with the pollutants in the combustion gas, is introduced between the dielectric and the neighboring electrode into a chamber that is transparent to UV rays, in particular one made of synthetic quartz. Suitable filler gases include, in particular, excimer gases, for example noble-gas halides. In this case, certain filler gases or filler-gas mixtures lead to special UV radiation wavelengths, such as e.g. XeCl: 308 nm, KrBr: 207 nm; KrCl: 222 nm.

The gas discharge is ignited independently of the flow direction of the gas. In this case, a large number of parameters, such as the way in which the electrodes are arranged and their material, optionally with catalytic activity, as well as the surface condition of the electrodes, pressure and temperature, frequency and operating voltage, can be used to exert a pronounced influence on the efficiency and the kinetics of the reaction.

According to the invention, a device is provided wherein two metallic components of the combustion space of an internal combustion engine are separated by a dielectric, in particular by at least one ceramic component, and wherein a pulsed voltage of from 1 to 500 kV, preferably from 10 to 300 kV, and a frequency of from 500 Hz to 50 kHz, preferably from 1 to 30 kHz, preferably with square-wave pulses, are applied to the two metallic components which have the function of electrodes. According to the invention, metallic components of the combustion space hence themselves act as electrodes; it is preferable to use the piston bottom or a part thereof and/or a spark plug or a part thereof for this purpose.

According to a preferred embodiment, one electrode is the piston bottom or a part of the piston bottom, and the dielectric is arranged in the spatial vicinity of the piston bottom, in particular directly on the piston bottom.

According to another preferred embodiment, one electrode is a spark plug, and a dielectric is arranged in the spatial vicinity of the spark plug, in particular directly on the spark plug.

According to another embodiment, a chamber which is transparent to UV rays, in particular one made of synthetic quartz, and which contains a filler gas, in particular an excimer gas may additionally be provided in the space between the electrode and the neighboring dielectric. Noble-gas halides, in particular, for example XeCl, KrBr, KrCl or mixtures thereof may be used for this purpose.

DBD treatment of the exhaust gases is preferably also provided immediately at the outlet of the internal combustion engine; a further improvement in the exhaust-gas reduction is achieved because of the high exhaust-gas temperature in this region.

The invention will be explained in more detail below with the aid of drawings and examples.

Figure 1:
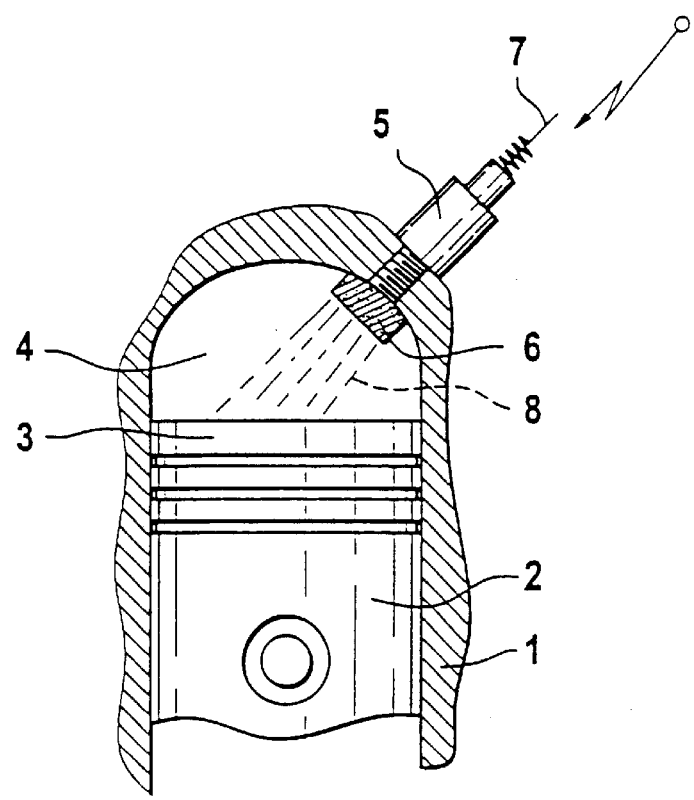
FIG. 1 shows a device according to the invention in a preferred exemplary embodiment.

The schematic representation in FIG. 1 shows a longitudinal section through the combustion space of an internal combustion engine having a cylinder wall 1, a piston 2 with a piston bottom 3 and a combustion space 4. A radiofrequency voltage 7 is applied to the ignition element 5, and a plasma 8 is produced by discharge via the electrode (not shown) arranged behind the dielectric 6 to the opposite piston bottom 3. Dielectric-barrier discharges are brought about by arranging the dielectric 6 in the immediate vicinity of the ignition element 5.

According to an alternative embodiment, the dielectric 6 may be arranged at a distance from the ignition element 5, in which case a chamber (not shown) that is made of a UV-transparent material, for example synthetic quartz, and contains a filler gas may be arranged in the region between the ignition element 5 and the dielectric 6.

Figure 2:
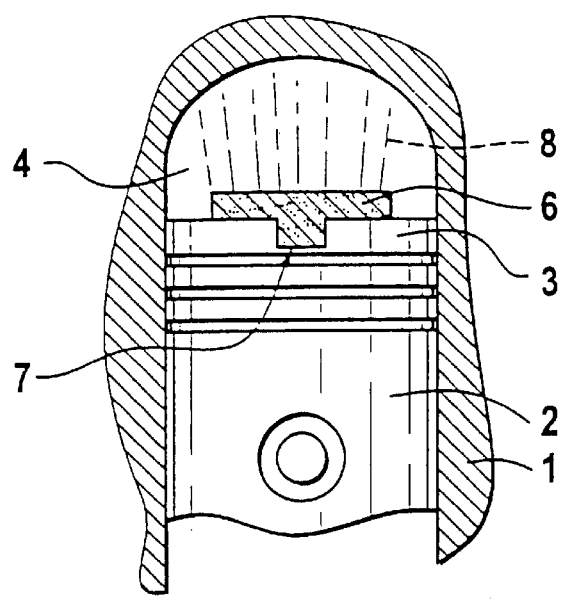
FIG. 2 shows a device according to the invention in an referred exemplary embodiment. Components which are the same or have the same function are denoted therein by the same reference numbers.

FIG. 2 shows another preferred alternative embodiment of a device according to the invention in longitudinal section having a cylinder wall 1, a piston 2 with a piston bottom 3 and a combustion space 4. A plasma 8 is produced by applying a radiofrequency voltage 7 between an electrode (not shown) arranged behind the dielectric 6 and the opposite wall of the combustion space 4, and dielectric-barrier discharges are brought about by arranging the dielectric 6 in the immediate vicinity of the piston bottom 3.

In a similar way to the special device variant according to FIG. 1, the dielectric 6 may be arranged at a distance from the piston bottom 3, and a chamber (not shown) of arbitrary geometry, which is transparent to UV rays and contains a filler gas, may be arranged in the region between the piston bottom 3 and the dielectric 6.

Figure 3:
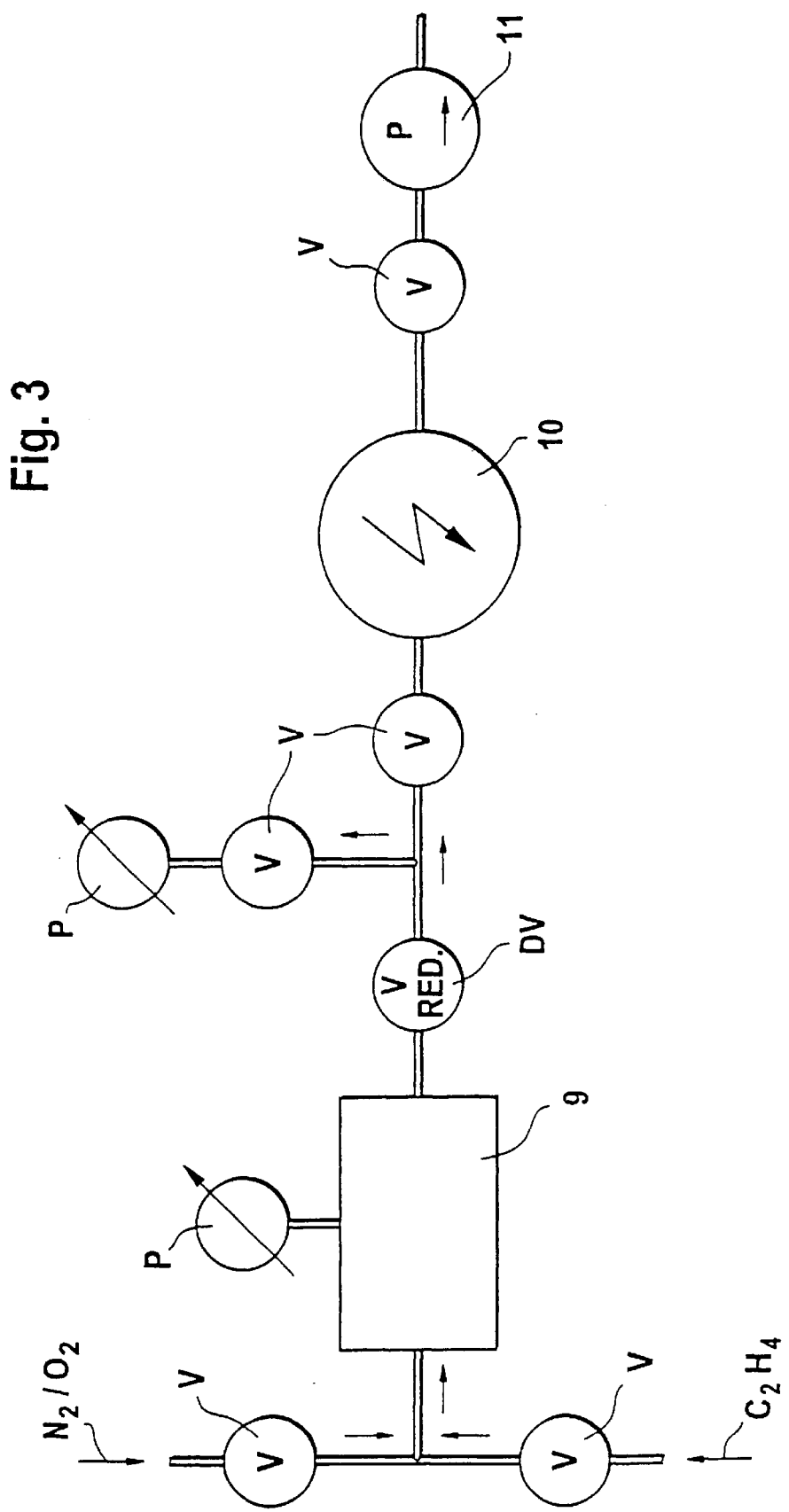
FIG. 3 shows the schematic representation of an experimental arrangement for measuring the pressure profile of an ignition cell.

FIG. 3 shows the schematic representation of an experimental setup for measuring the pressure profile when a mix is ignited by means of dielectric-barrier discharges. Ethylene ($C_2H_4$) as a combustible gas, and synthetic air i.e. a nitrogen/oxygen mixture in the volume ratio 80% nitrogen to 20% oxygen, are delivered in a regulated way into a gas line through valves V. The ethylene/air mixture entered the mixing chamber 9, the gas flow rate through the mixing chamber 9 having been controlled by means of a first baratron P. Further along the gas line between the mixing chamber 9 and the ignition cell 10, additional instruments for controlling the quantity of gas were provided: a throttle valve DV, valves V and another baratron P. The ignition cell was designed as a cylindrical chamber whose dimensions corresponded approximately to those of the combustion space in an internal combustion piston engine.

The vacuum pump 11 was used to evacuate the experimental system before the experiment was carried out, and until extraction of the combustion gases after the experiment had been completed.

Figure 3A:
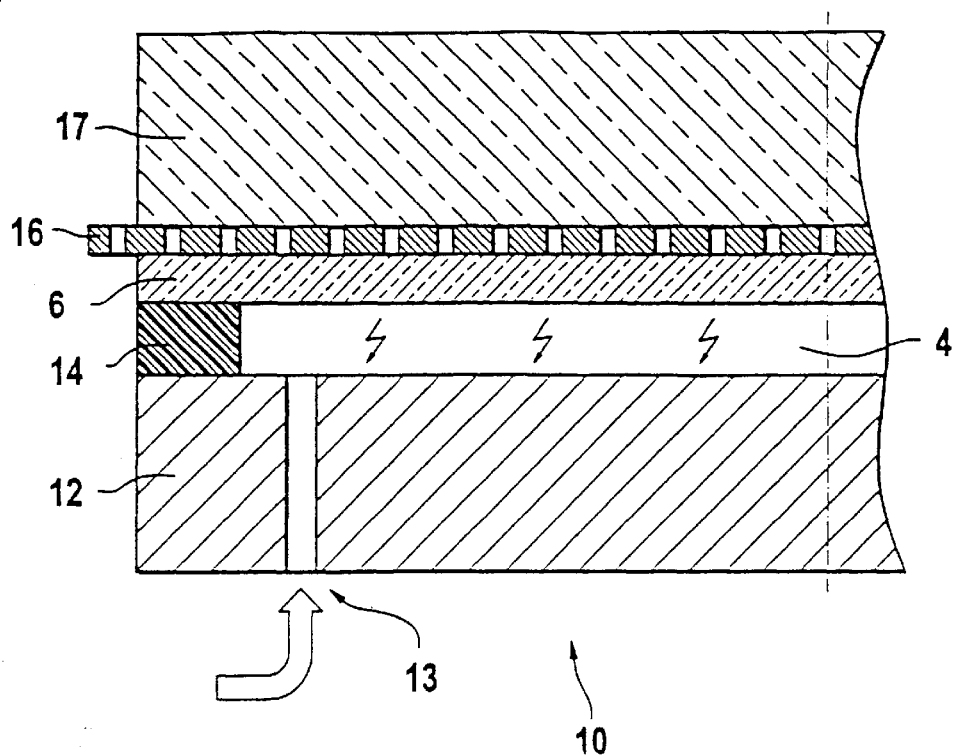
FIG. 3a shows a sectional representation of the ignition cell.

The ignition cell 10 is represented on an enlarged scale in longitudinal section by FIG. 3a: on a solid metal substructure 12 made of an iron alloy and having an inlet opening 13 for the fuel/air mix, an insulating PTFE ring 14 as a spacer, a transparent quartz-glass dielectric 6, a perforated sheet-iron electrode 16 and a quartz-glass block 17 were arranged in successive layers and were pressed together to form a disk-shaped combustion chamber 4. The combustion chamber 4 was connected to an outlet (no shown) for the combustion gases. A screw thread (not shown), which made it possible to accommodate a spark plug that protruded into the combustion chamber 4, was drilled into the metal substructure 12. Lastly, the combustion chamber 4 had a connector (not shown) for a pressure pickup which was used to record the pressure profile as a function of time.

The ignition cell 10 that was used as an example had a diameter of 100 mm and a height of 103 mm, with the following heights for the individual components:

metal substructure (reference number 12)—60 mm insulating ring (reference number 14)—3 mm dielectric (reference number 6)—4 mm perforated sheet-metal electrode (reference number 16)—1 mm quartz-glass block (reference number 17)—35 mm.

The free combustion chamber 4 had a height of 3 mm and an internal diameter of 80 mm.

The metal substructure 12 and the perforated sheet-metal electrode 16 were connected to a plasma generator which was operated at a high voltage of about 10 kV and a frequency of 1–10 kHz.

Figure 4:
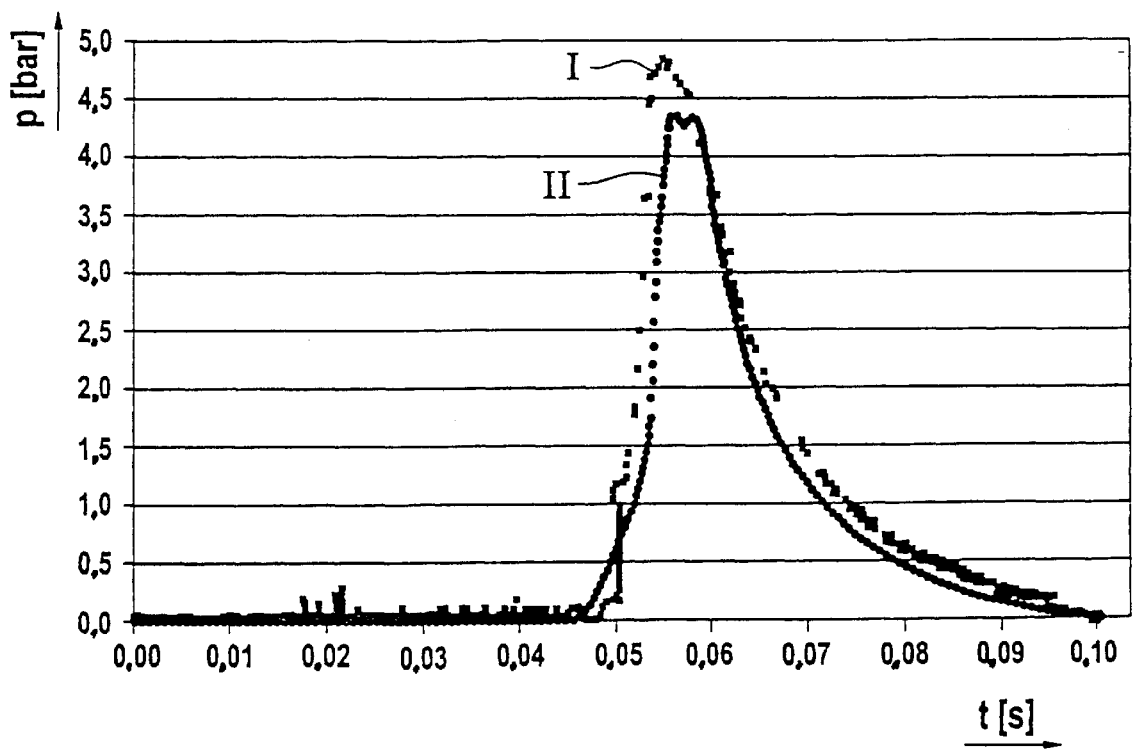
FIG. 4 shows the pressure profile as a function of time with ignition by spark plugs compared with ignition by means of dielectric-barrier discharge.

FIG. 4 shows a graphical representation of the pressure profile in the combustion chamber 4 at a lambda value of 0.8. As is known, the lambda value describes the air/fuel ratio of combustion reactions, with $\lambda=1$ corresponding to the stoichiometric ratio. The pressure p in bar is represented on the ordinate, and the time t in seconds is represented on the abscissa. Curve I shows the pressure profile in the case of ignition using the method according to the invention by means of dielectric barrier discharges, and curve II shows the pressure profile in the case of conventional ignition by means of a spark plug. The representation in FIG. 4 shows that the pressure increase in the case of the method according to the invention (curve I) takes place significantly more steeply and to a greater height than the conventional method (curve II). Under identical measurement conditions, a pressure increase to nearly 5.0 bar was obtained in the case of a method according to the invention, compared with less than 4.5 bar in the case of the conventional method. The combustion process is hence faster and more complete when using the method according to the invention.

According to the invention, the pollutants in exhaust gases of internal combustion engines are reduced, with the primary occurrence of pollutants in the combustion space being, in particular, reduced.

The device according to the invention and the method are particularly suitable for improving, and in particular balancing, the combustion process itself in the combustion space. By means of this, in particular, a reduction in the fuel consumption is also achieved in the case of both lean-burn engines and diesel engines.

Particularly advantageously, more effective combustion is ensured even in the event of lean fuel mixes.

Furthermore, according to the invention, the breakdown of the pollutants begins without delay, i. e. the method and the device are in particular suitable even for the particularly critical cold-start phase at the start of the operation, generally the first 200 seconds, which usually causes 70% of the cumulative hydrocarbon emissions in a standardized test cycle.

Since the method according to the invention intervenes directly in the combustion space, the combustion process itself is improved by a modified ignition behavior, the specific fuel consumption is thereby decreased and the reduced amount of pollutants that are created is broken down directly in the combustion space.

What is claimed is:

1. A method for plasma-induced chemical reduction of gaseous and/or solid pollutants in exhaust gases of internal combustion engines by using dielectric-barrier discharges, wherein the dielectric-barrier discharges are carried out in the combustion space (4) of the internal combustion engine.

2. The method as claimed in claim 1, wherein the dielectric-barrier discharges are produced by a pulsed voltage (7) which is applied between two metallic components of the combustion space (4) that are separated from each other by a dielectric (6).

3. The method as claimed in claim 2, wherein the frequency of the pulsed voltage (7) is from 500 Hz to 50 kHz.

4. The method as claimed in claim 2, wherein a voltage (7) has square-wave pulses.

5. The method as claimed in claim 2, wherein the applied voltage (7) is from 1 to 500 kV.

6. The method as claimed in claim 1, wherein the dielectric-barrier discharges are triggered at the mix-ignition time and/or at a later time in the combustion cycle by a control, and in that the control is performed by means of voltage and/or frequency as a function of the load and pollutants.

7. The method as claimed in claim 1, wherein an additional gas which, when the dielectric-barrier discharges are ignited, emits UV rays at particular wavelengths which interact in a specifically intended way with the pollutants in the combustion gas, is introduced between the dielectric (6) and a neighboring electrode into a chamber that is transparent to UV rays.

8. A device for carrying out the method as claimed in claim 1, wherein two metallic components of the combustion space (4) of an internal combustion engine are separated by a dielectric (6), and in that a pulsed voltage of from 1 to 500 kV, and a frequency of from 500 Hz to 50 kHz, are applied to the two metallic components which have the function of electrodes.

9. The device as claimed in claim 8, wherein one electrode is the piston bottom (3) or a part of the piston bottom (3), and in that the dielectric (6) is arranged in the spatial vicinity of the piston bottom (3).

10. The device as claimed in claim 8, wherein one electrode is a spark plug (5), and a dielectric (6) is arranged in the spatial vicinity of the spark plug (5).

11. The method as claimed in claim 2, wherein the frequency of pulsed voltage (7) is from 1 to 30 kHz.

12. The method as claimed in claim 2, wherein the applied voltage is from 10 to 300 kV.

13. The method as claimed in claim 1, wherein two metallic components of the combustion space of an internal combustion engine are separated by a dielectric, which comprises at least one ceramic component.

14. A device for carrying out the method as claimed in claim 8, wherein a pulsed voltage of from 10 to 300 kV and a frequency of from 1 to 30 kHz is applied to the two metallic components which have the function of electrodes.

15. A device for carrying out the method as claimed in claim 14, wherein the pulse voltage is a square wave pulse.

16. A device as claimed in claim 9, wherein the dielectric (6) is arranged directly on the piston bottom.

17. A device is claimed in claim 10, wherein the (6) dielectric is arranged directly on the spark plug.

* * * * *